UNITED STATES PATENT OFFICE.

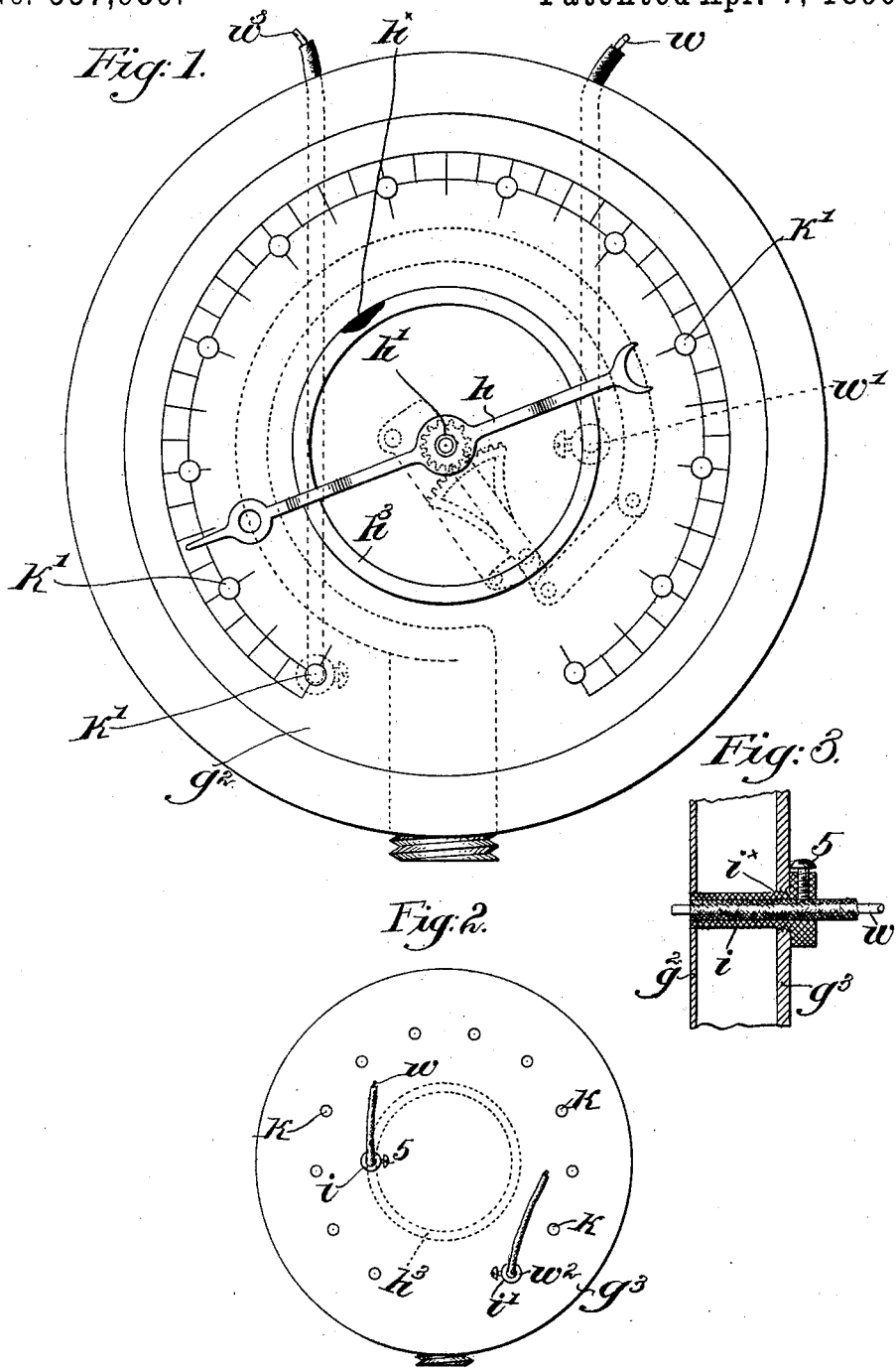

THOMAS M. GORDON, OF CAMBRIDGE, MASSACHUSETTS.

PRESSURE-GAGE.

SPECIFICATION forming part of Letters Patent No. 557,989, dated April 7, 1896.

Application filed June 7, 1895. Serial No. 551,990. (No model.)

*To all whom it may concern:*

Be it known that I, THOMAS M. GORDON, of Cambridge, county of Middlesex, State of Massachusetts, have invented an Improvement in Pressure-Gages, of which the following description, in connection with the accompanying drawings, is a specification, like letters on the drawings representing like parts.

This invention has for its object improvements in pressure-gages having automatic or other electrical signaling connections.

The details of construction of my invention and the advantages thereof will be more fully set forth in the accompanying description and claims.

In the drawings, Figure 1 is an enlarged face view of the signal-controlling gage. Fig. 2 is an under side view thereof. Fig. 3 is an enlarged partially-sectional view of part of the gage and one of the contact-pins.

I have herein shown my improvements applied to an ordinary gage, a well-known Bourdon type of gage being shown for the purposes of illustration.

The pointer $h$ is insulated at $h'$ from its usual supporting-spindle $h^2$ and is bent to sweep over and contact with a metal ring $h^3$, supported on the dial $g^2$ and insulated therefrom at $h^\times$. A sleeve $i$ of insulating material is inserted in the back $g^3$ of the gage, directly beneath the ring $h^3$, this sleeve having extended therethrough to receive the end of a wire $w$ a set-screw 5, maintaining the wire securely in place with its bared terminal $w'$ in contact with the under side of the ring $h^3$.

A concentric series of holes $k$ are made in the back $g^3$ of the gage, and corresponding holes $k'$ are made in the dial $g^2$ at points corresponding to various pressures.

The holes $k$ are preferably threaded to receive a sleeve $i'$, surrounding and secured to the other terminal $w^2$ of the electric circuit, said sleeve and the manner of receiving and holding the wire being precisely as shown and described for the sleeve $i$, (shown in Fig. 3,) both of the sleeves being preferably threaded, as at $i^\times$, to enter the threaded holes in the gage-back $g^3$.

From the foregoing it will be evident that the terminal $w'$ is in continuous contact with the ring $h^3$, and thereby with the pointer $h$, and that wherever the said pointer comes in contact with the terminal $w^2$, projecting in its path above the dial $g^2$, the circuit through wire $w$ and return-wire $w^3$ will be closed, and if a bell or other suitable signaling device be included in the circuit it will be operated to give a signal or alarm upon closure of the circuit.

While I have indicated but one electric circuit $w\ w^3$, it is evident that a number of circuits may be included by using a plurality of binding-sleeves and terminals.

I claim—

1. In a pressure-gage, a pointer insulated from the body of the gage, an electric terminal in continuous electrical contact with said pointer, a plurality of holes spaced apart throughout the length of the dial-scale, and an adjustable terminal for insertion into and removal from any of said holes in the path of said pointer, substantially as described.

2. The combination with a pressure-gage, and its movable pointer, insulated therefrom, of a plurality of perforations, concentrically arranged in the path of said pointer, corresponding to different pressures, to receive, in suitably-insulated engagement therein, the adjustable terminal of an electric circuit, and an annulus, concentric with said perforations, secured to and insulated from said gage, in continuous contact with said pointer, to constitute the other terminal of said circuit, substantially as described.

3. A pressure-gage, its movable pointer insulated therefrom, an annular electric terminal in continuous contact with said pointer and insulated from said gage, a series of perforations in said gage in the path of said pointer, an insulated binding-sleeve secured to said gage and annulus, and an insulated binding-sleeve provided for adjustment in said perforations, all combined, substantially as described.

In testimony whereof I have signed my name to this specification in the presence of two subscribing witnesses.

THOMAS M. GORDON.

Witnesses:
JOHN C. EDWARDS,
AUGUSTA E. DEAN.